Patented May 3, 1932

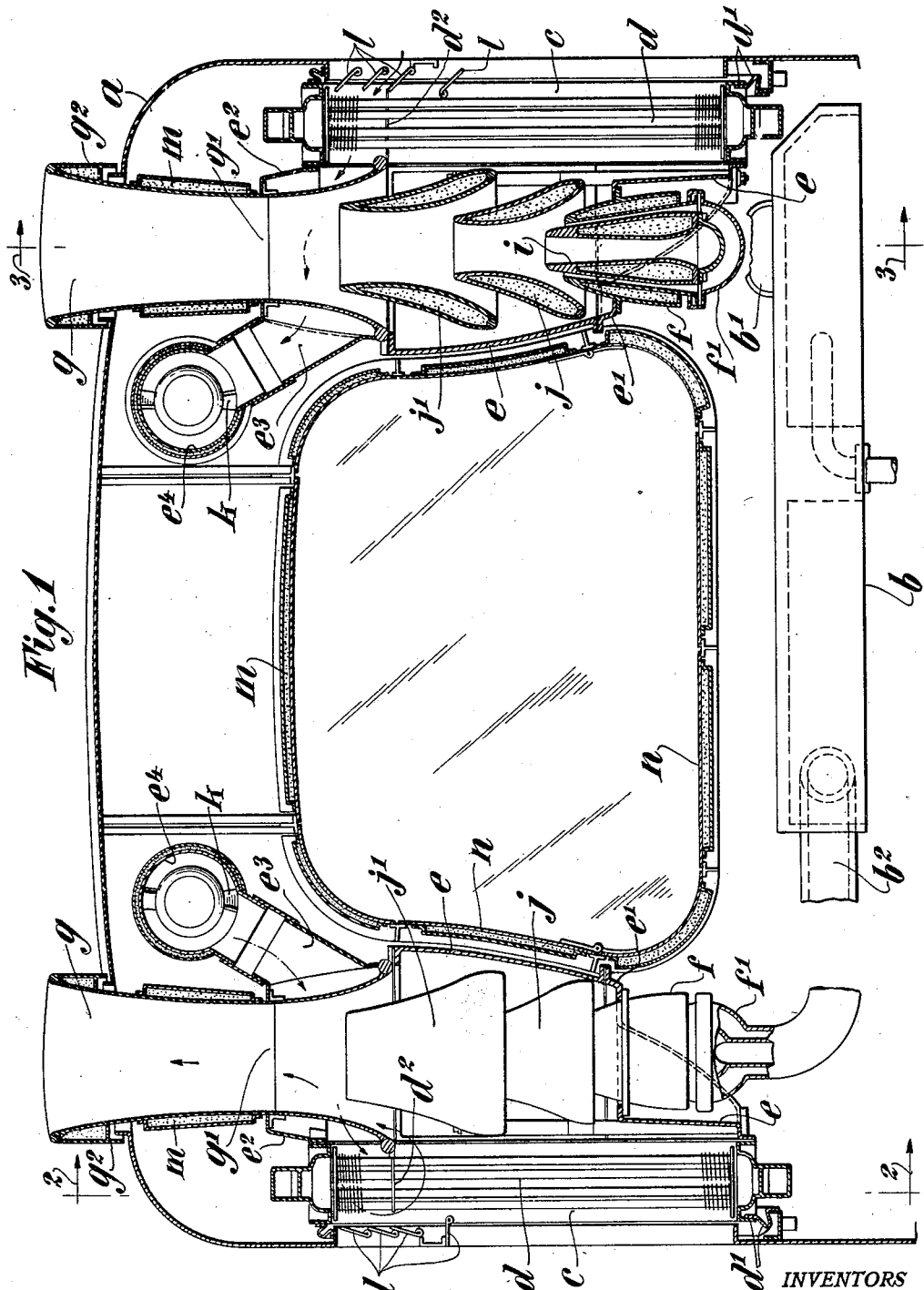

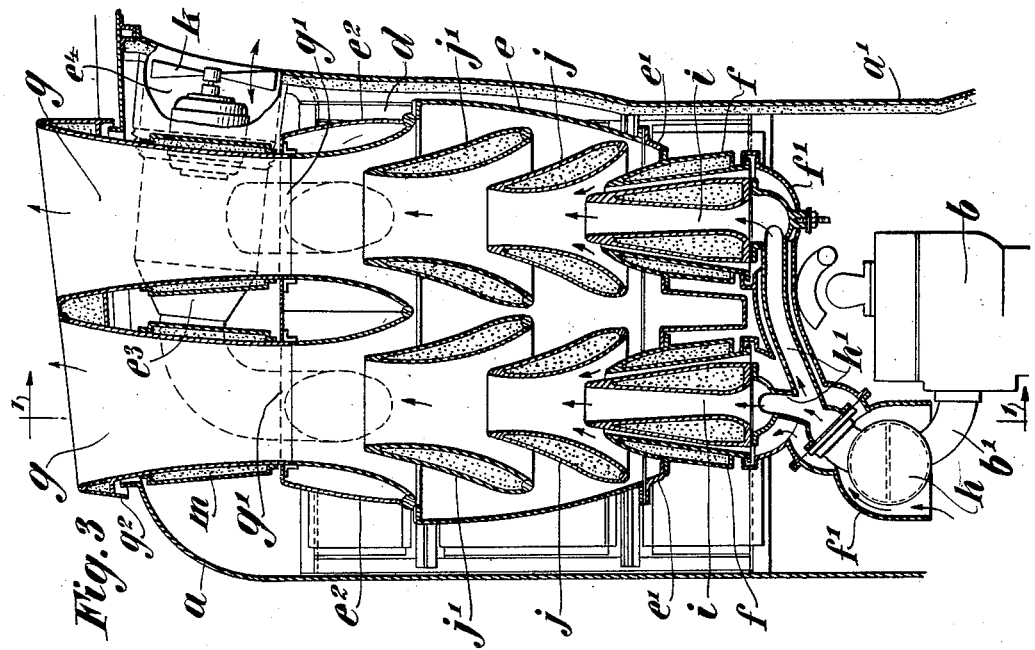
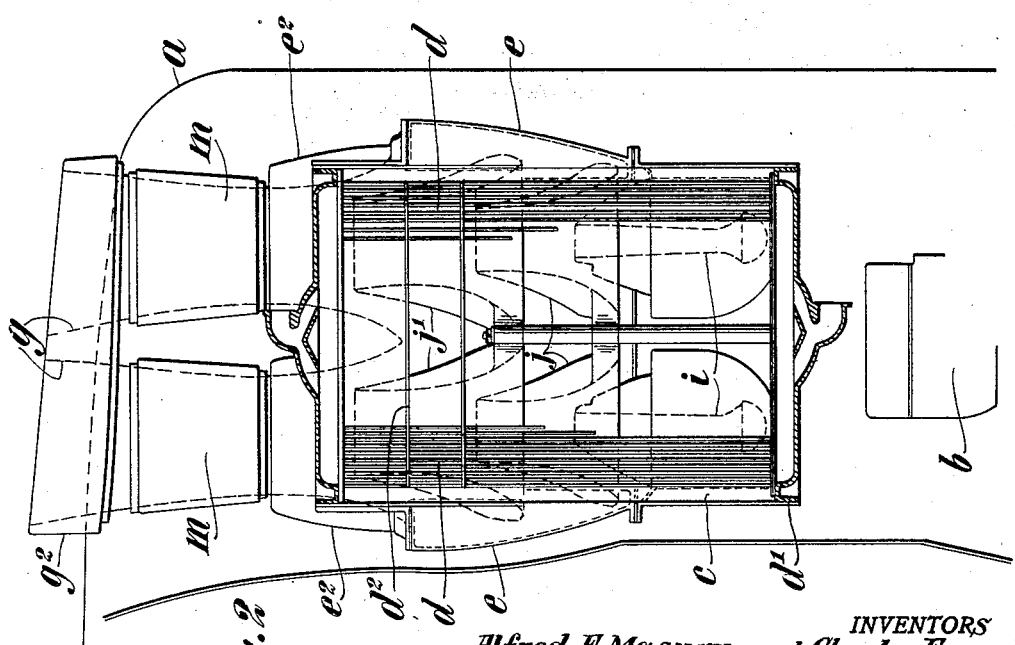

1,856,772

UNITED STATES PATENT OFFICE

ALFRED F. MASURY, OF NEW YORK, N. Y., AND CHARLES FROESCH, OF TEANECK, NEW JERSEY, ASSIGNORS TO INTERNATIONAL MOTOR COMPANY OF NEW YORK, N. Y., A CORPORATION OF DELAWARE

COOLING SYSTEM

Original application filed March 27, 1928, Serial No. 265,136. Divided and this application filed July 29, 1930. Serial No. 471,526.

The present application is a division of the application of Alfred F. Masury and Charles Froesch, Ser. No. 265,136, filed March 27, 1928, for Cooling system which relates to mountings for cooling systems in the rear end of motor vehicles, the internal combustion engines of which are likewise mounted at the rear. The present invention is specifically directed to a vehicle body construction wherein provision is made for mounting the foregoing mechanism suitably, at the same time providing a maximum body space and a rear window through which rear vision is afforded. In previous designs, the exhaust from the engines mounted in this manner has been utilized to induce a flow of cooling air through the side radiators by means of Venturi throats formed in the exhaust line. This type of construction permits the entire power plant to be mounted as a unit at the rear of the vehicle and enables it to be mounted and dismounted quite readily.

In addition to the above features, the present invention includes a ventilating system for the interior of the vehicle which enables air to be drawn in through the radiator and discharged into the interior of the vehicle as warm air or, if desired, causes air from the interior to be sucked out through the radiator and discharged from the exhaust stack. The latter path is for summer service while the former serves to supply warm air for heating and ventilating the vehicle in the winter time.

Further objects will appear as the description proceeds and reference will now be had to the accompanying drawings, wherein:

Figure 1 is a view in section taken on line 1—1 of Figure 3, and looking in the direction of the arrows.

Figure 2 is a view in section taken on line 2—2 of Figure 1, and looking in the direction of the arrows.

Figure 3 is a view in section taken on line 3—3 of Figure 1, and looking in the direction of the arrows.

Referring to the above figures, $a$ designates the body of a vehicle provided with an internal combustion engine $b$. The form shown is of the six cylinder type, the front three cylinders exhausting into the exhaust pipe $b'$ and the rear three into exhaust pipe $b^2$. At the rear of the vehicle, a partition $a'$ forms a compartment for the power unit to be described later.

At either side of the body $a$, apertures $c$ are formed to the rear of which radiators $d$ are mounted. Suitable connections $d'$ accommodate expansion of the radiator and preserve a weather tight joint between it and the side of the vehicle.

Secured to the rear faces of the radiators are housings $e$ which are provided with horizontal steps $e'$ to receive exhaust lines formed, in the present instance, as Venturi housings $f$. These housings communicate with jackets $f'$ about the exhaust pipe and manifold and provide a means for ventilating the engine compartment as indicated by the solid arrows about the exhaust manifold in Figure 3. The housings $e$ also communicate with exhaust stacks $g$ and permit the cooling air to be discharged into the atmosphere after having passed through the radiators.

The exhaust gases pass from the exhaust manifold $h$ through exhaust pipes $h'$ into Venturi nozzles $i$. Being discharged from these nozzles they flow through successive Venturi throats $j$, $j'$ and stack $g$, the latter being formed with a restricted portion $g'$ to cause a further increase in the velocity of the gases as they pass through the stack.

Through the upper portion of the radiators $d$ a horizontal partition $d^2$ is formed, separating the cooling gases which pass above the partition from those passing below the partition and flowing into the housings $e$. Immediately above the housings $e$, auxiliary housings $e^2$ are formed and the air flowing through the upper portion of the radiator and into housings $e^2$ is carried through conduits $e^3$ and motor housing $e^4$ into the interior of the vehicle as indicated in Figure 3. A small electric fan $k$ is mounted in the motor housing $e^4$ and creates a flow of air into the vehicle under the proper conditions. When it is desired to draw air from the interior of the vehicle, pivoted louvres $l$ are closed, thus preventing air from being drawn from the exterior of the vehicle through the upper portion of the radiator $e$. With the louvres closed, the Venturi throat $g'$ causes air to be drawn through conduit $e^3$, auxiliary housing $e^2$, through the upper portion of the radiator and out through the stack is indicated by dot and dash arrows to the left of Figure 1. The louvres at the left of Figure 1 are shown as closed, which position corresponds to summer operation, while those at the right of Figure 1 are shown as open, corresponding to operating conditions in the winter time. It will be quite apparent that in the summer time the electric fan $k$ will not be in operation.

The housing $e$ is sectionalized for convenience in manufacture and assembly, and the stacks are formed with over-hanging lips $g^2$ to form a storm-tight joint with the roof while permitting expansion and contraction between these members. Suitable heat insulation $m$ is provided on the partitions and walls which might readily transmit and radiate heat.

A very important feature of this invention resides in the formation of the walls as curved surfaces. The housings $e$, $e^2$, conduits, radiator mountings, and window aperture $n$ are all formed with curved walls, thus preventing body drumming which results from the diaphragm action of plain body walls under vibration. By providing two stacks at either side of the vehicle they may be made small enough to accommodate a window opening $n$ at the rear of the vehicle and between the stacks. The desirability of this element is quite apparent and its shape such that its walls, being formed with curved surfaces, will not cause drumming.

The invention has been described in connection with the specific construction shown in the accompanying drawings, but its scope is not to be limited, save as defined in the appended claims.

We claim as our invention:

1. A vehicle construction comprising a compartment formed at the rear of the vehicle, side radiators in the compartment, housings communicating with the radiators, exhaust stacks passing through the housings, and means to cause the exhaust gases to draw cooling air through the radiators and into the stacks, the walls of the compartment and housings being curved to prevent drumming.

2. A vehicle construction comprising a compartment formed at the rear of the vehicle, side radiators in the compartment, housings communicating with the radiators, exhaust stacks passing through the housings, a central opening through the compartment between the housings, and a window in the rear of the opening, the walls of the opening and housings being curved.

This specification signed.

ALFRED F. MASURY.
CHARLES FROESCH.